United States Patent
Fraley et al.

(10) Patent No.: US 10,479,257 B1
(45) Date of Patent: Nov. 19, 2019

(54) ROAD TRAILER WITH LIFT FRAME FOR TRANSPORTING AND DEPLOYING LEGGED CONTAINERS

(71) Applicant: King Kutter II, Inc., Gallipolis, OH (US)

(72) Inventors: J. Phillip Fraley, Winfield, AL (US); John W. Davis, III, Winfield, AL (US)

(73) Assignee: King Kutter II, Inc., Gallipolis, OH (US)

( * ) Notice: Subject to any disclaimer, the term of this patent is extended or adjusted under 35 U.S.C. 154(b) by 0 days.

(21) Appl. No.: 16/156,416

(22) Filed: Oct. 10, 2018

Related U.S. Application Data

(63) Continuation-in-part of application No. 15/990,119, filed on May 25, 2018.

(60) Provisional application No. 62/570,479, filed on Oct. 10, 2017, provisional application No. 62/511,140, filed on May 25, 2017.

(51) Int. Cl.
*B60P 1/64* (2006.01)
*B62D 53/08* (2006.01)
*B60P 1/02* (2006.01)

(52) U.S. Cl.
CPC ........... *B60P 1/6445* (2013.01); *B60P 1/02* (2013.01); *B60P 1/649* (2013.01); *B62D 53/08* (2013.01)

(58) Field of Classification Search
CPC .................................................. B60P 1/6445
See application file for complete search history.

(56) References Cited

U.S. PATENT DOCUMENTS

| | | | | |
|---|---|---|---|---|
| 2,475,443 A | * | 7/1949 | Bill | B60P 1/025 280/423.1 |
| 2,858,950 A | * | 11/1958 | Martin | B62D 53/065 280/425.2 |
| 3,362,552 A | * | 1/1968 | Thiele | B60P 1/6427 414/469 |
| 3,429,585 A | * | 2/1969 | Ross | B62D 53/065 280/43.23 |
| 3,520,433 A | * | 7/1970 | Blackburn | B60P 1/6427 410/90 |
| 3,650,416 A | * | 3/1972 | Bodenheimer | B60P 1/6445 206/335 |
| 4,302,022 A | * | 11/1981 | Schoeffler | B60G 17/00 280/417.1 |
| 4,339,148 A | * | 7/1982 | Smith | B62D 21/186 105/363 |
| 4,372,572 A | * | 2/1983 | Verschage | B62D 53/065 280/441.2 |
| 5,326,214 A | * | 7/1994 | Swisher, Jr. | B60P 1/02 414/458 |

* cited by examiner

*Primary Examiner* — Jonathan Snelting
(74) *Attorney, Agent, or Firm* — Angela Holt; Bradley Arant Boult Cummings LLP

(57) ABSTRACT

A trailer has a main frame with a neck portion on its forward end. A pivot fifth wheel is rotatably affixed to the forward end of the neck portion. The pivot fifth wheel releasably attaches to the fifth wheel of a towing vehicle. An axle frame is rotatably affixed to the rearward end of the main frame, and rotates with respect to the main frame. The pivot fifth wheel and the axle frame are configured to pivot and move the main frame upwardly a vertical distance.

17 Claims, 6 Drawing Sheets

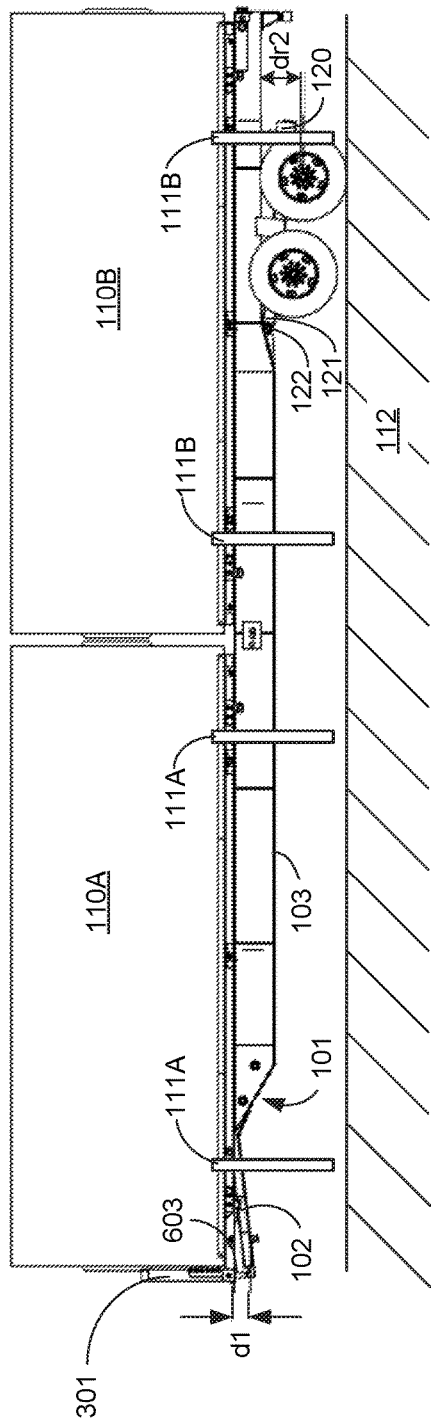
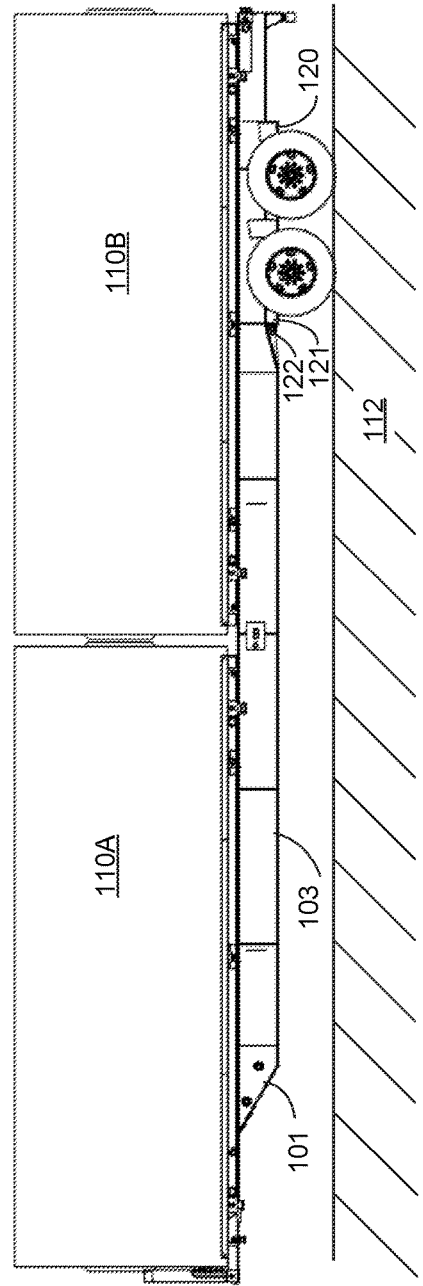
Fig. 3
Fig. 4

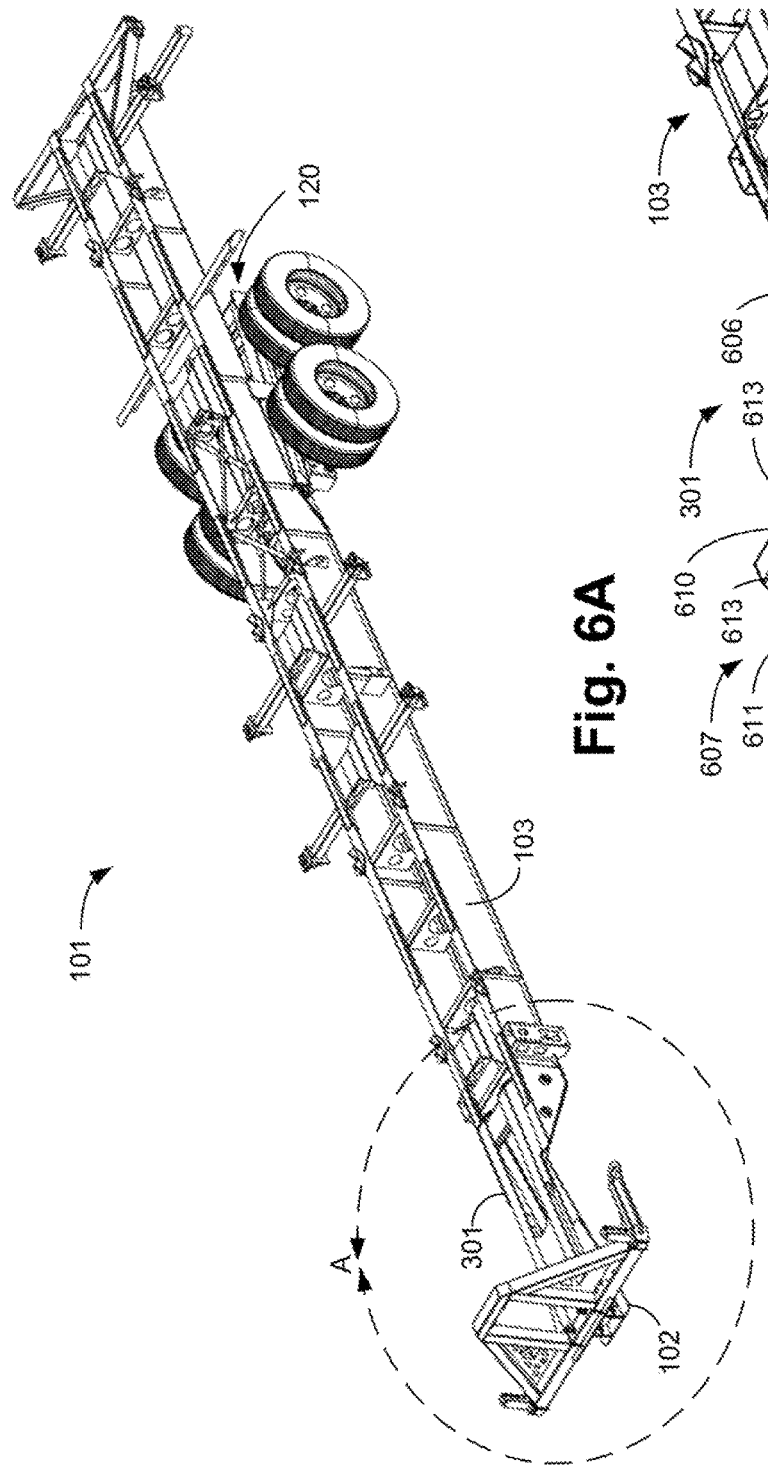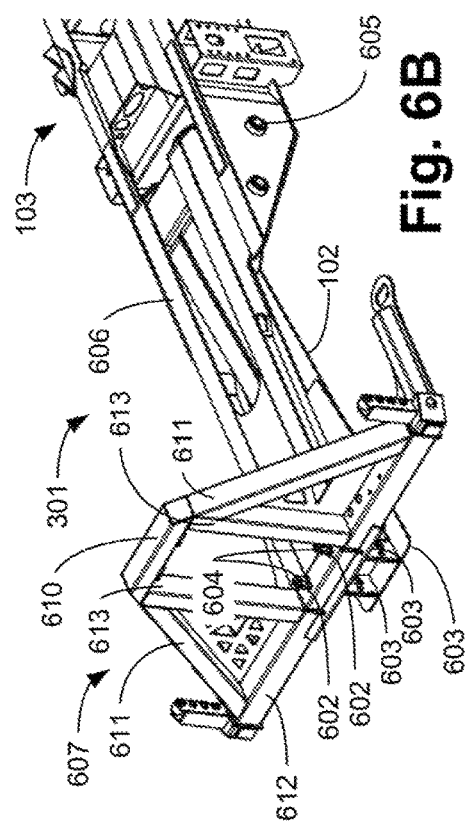

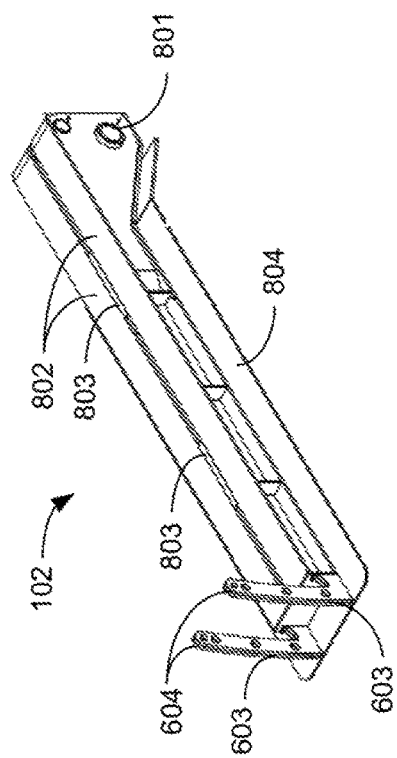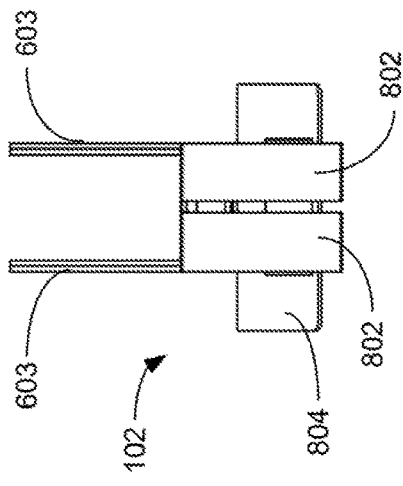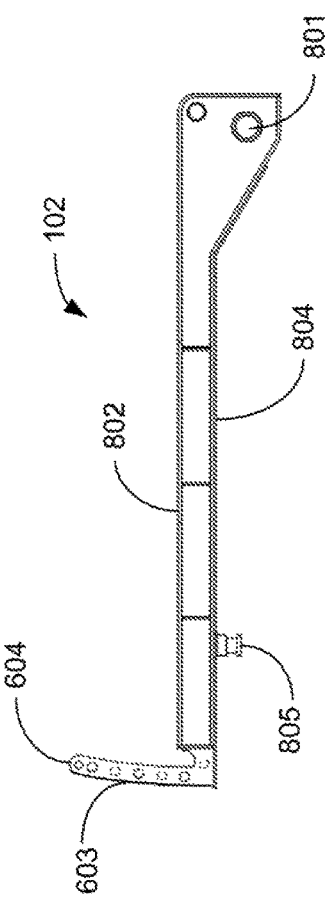

ROAD TRAILER WITH LIFT FRAME FOR TRANSPORTING AND DEPLOYING LEGGED CONTAINERS

CROSS REFERENCE TO RELATED APPLICATIONS

This application claims the benefit of U.S. Provisional Application No. 62/570,479 filed on Oct. 10, 2017. This application is also a continuation-in-part of, and claims priority to, U.S. non-provisional patent application Ser. No. 15/990,119, titled "Yard Trailer with Lift and Alignment Mechanism," filed May 25, 2018, which application claimed priority to U.S. Provisional Application No. 62/511,140 filed on May 25, 2017. The entire contents of the prior applications are incorporated herein by reference.

BACKGROUND AND SUMMARY

A road trailer according the present disclosure allows containers to be lifted and loaded onto the trailer with minimal effort and expense. Two containers may be disposed end-to-end, each container on legs, at the beginning of the lift and load operation. In one embodiment, a trailer is backed under the containers, between the legs, until the frame of the trailer is aligned with the containers. The frame is then lifted to engage with the containers.

In this regard, the trailer has a main frame with a neck portion on its forward end. A pivot fifth wheel is rotatably affixed to the forward end of the neck portion. The pivot fifth wheel releasably attaches to the fifth wheel of a towing vehicle. An axle frame is rotatably affixed to the rearward end of the main frame, and rotates with respect to the main frame. The pivot fifth wheel and the axle frame are configured to pivot and move the main frame upwardly a vertical distance.

After the main frame is lifted to engage with and lift the container, the container legs are stowed, then the frame is retracted and locked to the main frame of the trailer for transport. After the trailer reaches its destination, the process is reversed: namely, the frame lifts the containers; the container legs are deployed; the frame is retracted, and the trailer is moved, leaving the containers resting on their legs for further transport by short trucks.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 3 depicts the trailer after the frame moves upwardly to contact the underside of the containers to and lift the containers off of the surface.

FIG. 4 depicts the containers on the trailer after the legs of the containers have been stowed.

FIG. 6A is a front perspective view of the trailer of FIG. 5, with the trailer in a raised position.

FIG. 6B is an enlarged view of the neck portion of the trailer of FIG. 6A, taken along detail line "A" of FIG. 6A.

FIG. 8A is a front perspective view of the pivot fifth wheel according to an exemplary embodiment of the present disclosure.

FIG. 8B is a side plan view of the pivot fifth wheel of FIG. 8A.

FIG. 8C is a rear end plan view of the pivot fifth wheel of FIG. 8A.

DETAILED DESCRIPTION

Figure 1:
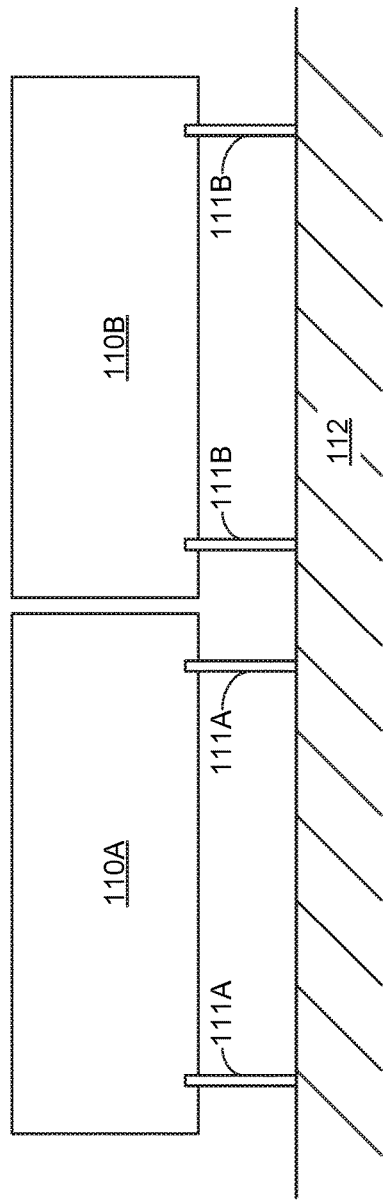
FIG. 1 depicts an exemplary configuration of two containers spaced apart end-to-end, each container supported by legs on a surface.

FIG. 1 depicts an exemplary configuration with two containers 110A and 110B, spaced apart end-to-end, each container supported by four (4) legs 111A and 111B, respectively on a surface 112. (Note that FIG. 1 shows only two legs on each container; the opposite side legs are not shown in FIG. 1.) In one embodiment, the legs are deployed to support the containers, and are stowed during transport.

Figure 2:
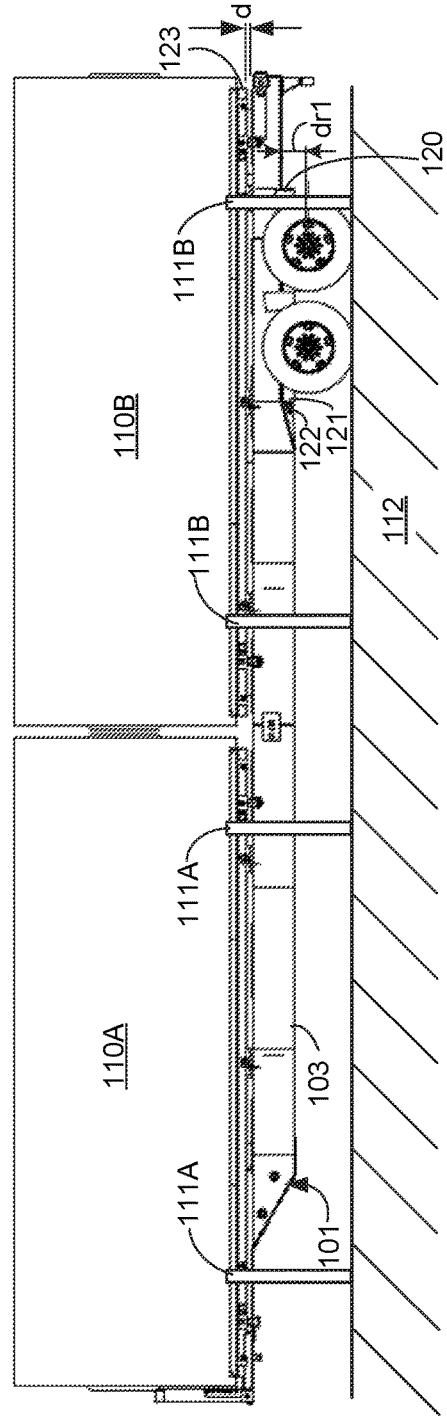
FIG. 2 depicts an exemplary trailer after the trailer has been positioned under the containers shown in FIG. 1.

FIG. 2 depicts a trailer 101 after the trailer 101 has been positioned under the containers 110A and 110B. In this regard, a width of the trailer 101 is less than a transverse distance between the containers' legs, such that the trailer 101 fits between the container legs without contacting the legs or the containers. A main frame 103 of the trailer 101 is disposed a distance "d" beneath the bottom of the I-beams 123 on the underside of the containers 110A and 110B. The distance "d" provides sufficient clearance such that the trailer 101 does not hit the underside of the containers 110A and 110B when moving beneath them. The distance "d" is two inches in one embodiment, but can be other distances is other embodiments.

A distance "dr1" is the distance between the center of the rear wheels and the bottom of the main frame 103 when the trailer 101 is in this configuration. The distance dr1 is 12 and ⅞ inches in one embodiment.

An axle frame 120 is rotatably affixed to the rearward end of the main frame 103 and rotates with respect to the main frame at pivot point 122, located on a frontward end 121 of the axle frame.

In operation of the trailer 101 to load containers, the main frame 103 is moved upwardly to contact and lift the containers 110A and 110B, as further discussed herein with respect to FIG. 3.

FIG. 3 depicts the trailer 101 after the frame 103 moves upwardly to contact the underside of the containers 110A and 110B and lift the containers off of the surface 112. In this regard, the frame 103 moves upwardly with respect to the axle frame 120 and with respect to a pivot fifth wheel 102 pivotally affixed to the frame 103 of the trailer 101 at the forward end of the trailer 101. The pivot fifth wheel 102 is located beneath the fifth wheel. (not shown) of a towing vehicle (not shown). Further, the pivot fifth wheel 102 is rotatably affixed to a neck 301 of the trailer 101. The neck 301 is rigidly affixed to the main frame 103 of the trailer 101.

In the illustrated embodiment, the neck 301 comprises openings (FIG. 6A) that receive protrusions 603 that protrude from the pivot fifth wheel 102 substantially perpendicular to the pivot fifth wheel 102.

In one embodiment, hydraulic cylinders (not shown) are used to push the pivot fifth wheel 102 and the axle frame 120 downwardly, which actions raise the main frame 103 upward a vertical distance "d1." In one exemplary embodiment, the distance d1 is eight (8) inches. In other embodiments, the distance d1 is between four (4) inches and eighteen (18) inches.

A distance "dr2" is the distance between the wheel centerline and the bottom of the main frame 103 when the trailer 101 is raised. The distance "dr2" is 20⅞ inches in one embodiment.

After the frame 103 lifts the containers 110A and 110B, the legs of the containers 110A and 110B can be stowed, and the frame 103 moved downwardly, as shown in FIG. 4. The trailer 101 can then be transported to its destination.

When the trailer 101 reaches its destination, the frame 103 is moved upwardly to a distance sufficient for legs of the containers 111A and 111B to be re-deployed. After the legs are re-deployed, the frame 103 is moved back down, and the trailer 101 is moved out from under the containers 110A and 110B. The containers 110A and 110B are left supported by their legs, and can be transported elsewhere by short trucks, or unloaded, or the like.

Figure 5:
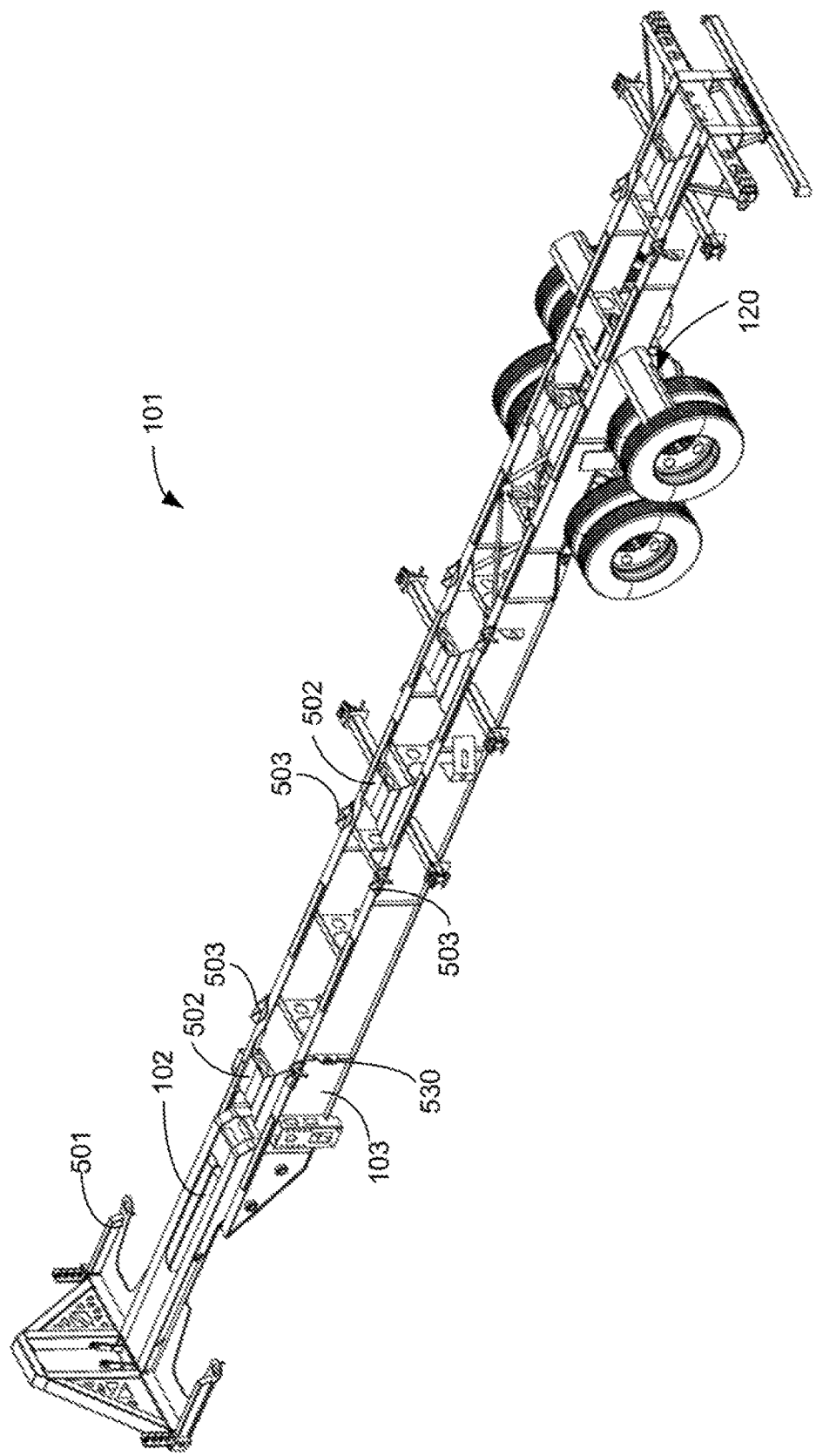
FIG. 5 is a rear perspective view of the trailer with the frame in a transport position.

FIG. 5 is a rear perspective view of the trailer 101 with the frame 103 in a transport position, i.e., not moved upwardly. The neck 301 on the forward end of the trailer is rigidly affixed to the main frame 103.

The frame 103 of the trailer 101 comprises a plurality of guide plates 502 disposed on a top surface of the frame 103. The guide plates extend upwardly from the frame and are configured to help align the containers 110A and 110B (FIG. 1) laterally onto the frame, as the frame 103 is moved upward. In this regard, the guide plates 502 fit within I-beams (not shown) on the bottom of the containers 110A and 110B when the containers are roughly aligned in the lateral direction.

The frame 103 further comprises a plurality of angles 503 that help fine-align the containers with the frame 103. The angles 503 receive and mate with pins (not shown) on the I-beams on the bottom of the containers 110A and 110B.

In other embodiments, the frame 103 comprises rollers (not shown) instead of or in addition to the guide plates 502. The rollers would keep the trailer 101 aligned with the boxes as the trailer is backed under them.

FIG. 6A is a front perspective view of the trailer 101 of FIG. 5, with the trailer 101 in a raised position, as also discussed with respect to FIG. 3 herein. The axle frame 120 is rotated downwardly as shown in FIG. 3, and the pivot fifth wheel 102 is also rotated downwardly.

FIG. 6B is an enlarged view of the neck portion of the trailer 101 of FIG. 6A, taken along detail line "A" of FIG. 6A. The neck 301 is pivotally attached to the pivot fifth wheel 102, at pivot point 605 in the illustrated embodiment. The neck 301 comprises a neck beam 606 extending longitudinally; the neck beam 606 rigidly affixed to the main beam 103.

A front end portion 607 of the neck 301 is rigidly affixed to the neck beam 606. The front end portion 607 comprises a bolster tube 612 that extends transversely across the neck 301. Two leg tubes 613 extend upwardly from the bolster tube 612, spaced apart from one another. An upper cross tube 610 extends between the two leg tubes 613 at the top ends of the leg tubes 613. Angled tubes 611 extend from the top ends of the leg tubes 613 to the bolster tube 612 and create an "A"-frame shape.

In the illustrated embodiment, the bolster tube 612 comprises two openings 602 between the two leg tubes 613. The openings extend vertically through the bolster tube 612 and are configured to receive protrusions 603 that extend from the pivot fifth wheel 102. In operation of the trailer 101, upper ends 604 of the protrusions 603 connect to hydraulic cylinders (not shown) that push downward on the protrusions 603 to raise the front end of the trailer 101, as further discussed herein with respect to FIGS. 7A and 7B.

In other embodiments, the protrusions 603 may not extend through the bolster tube 612.

Figure 7B:
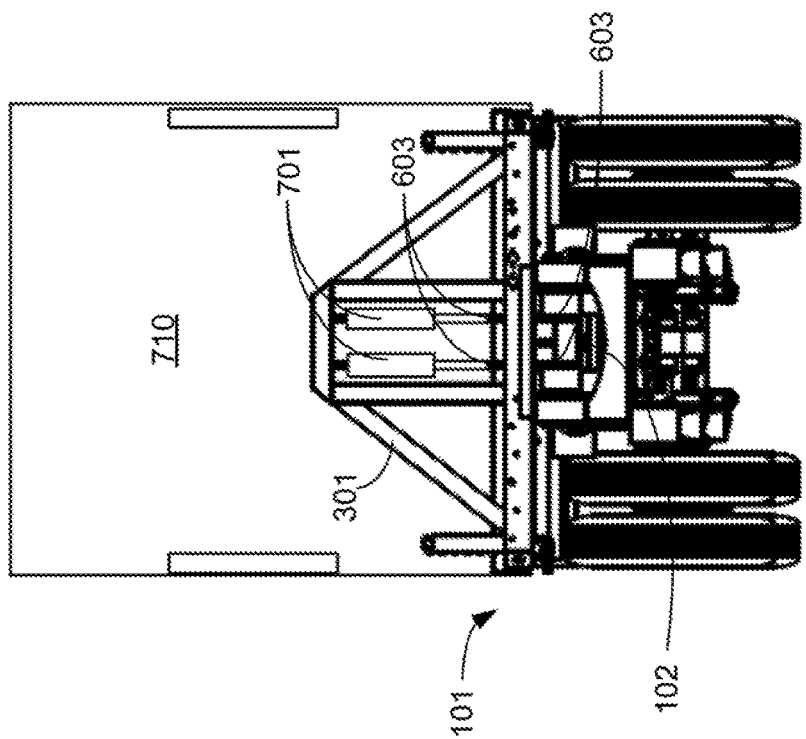
FIG. 7B depicts the trailer of FIG. 7A in a lifted configuration.
Figure 7A:
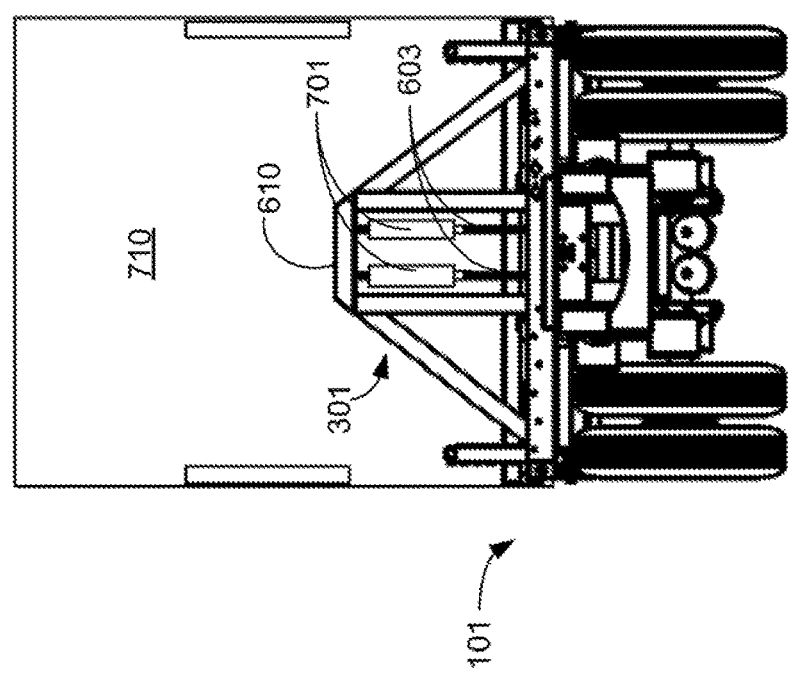
FIG. 7A is an end view of the trailer with a container on the trailer 101.

FIG. 7A is an end view of the trailer 101 with a container 710 on the trailer 101. The trailer 101 is not lifted in this configuration. Two hydraulic cylinders 701 are connected between the neck 301 and the protrusions 603 of the pivot fifth wheel (not shown). In this, regard, the hydraulic cylinders 701 extend between the upper ends 604 (FIG. 6B) of the protrusions 603 and the upper cross tube 610 (FIG. 6) of the neck. In operation of the trailer 101 to lift the main frame 103, the hydraulic cylinders 701 extend and produce a downward force on the protrusions 603 of the pivot fifth wheel, which action forces the main frame 103 upwards.

In the illustrated embodiment, the hydraulic cylinders 701 are disposed substantially vertically between the protrusions 603 and the upper cross tube 610. The vertical orientation means that the cylinders 603 move straight up and down during the lifting operation. The up and down movement, as opposed to an angular movement, minimizes the size of cylinder required and puts less of a load on the structure of the trailer 101, which means that the structural size of the trailer 101 can be minimized.

Because the hydraulic cylinders 701 are disposed substantially vertically between the protrusions 603 and the upper cross tube 610 in the illustrated embodiment, the protrusions 603 and the upper cross tube 610 are in substantially the same vertical plane and are aligned with one another.

FIG. 7B depicts the trailer 101 of FIG. 7A, in a lifted configuration. As shown in the figure, the hydraulic cylinders 701 have extended to force the protrusions 603 down until the trailer 101 lifts upward.

FIG. 8A is a front perspective view of the pivot fifth wheel 102 according to an exemplary embodiment of the present disclosure. The pivot fifth wheel 102 is formed from two longitudinal beams 802 separated by spacer bars 803 in this embodiment. A ride plate 804 is disposed on the underside of the longitudinal beams. The ride plate 804 supports the kingpin 805 (FIG. 8B). The protrusions 603 extend upwardly from a front end of the pivot fifth wheel 102. A bushing 801 is the pivot point between the pivot fifth wheel 102 and the neck 301 (FIGS. 6A and 6B)

FIG. 8B is a side plan view of the pivot fifth wheel 102 of FIG. 8A. The protrusions 603 extend upwardly and curve slightly inwardly from their base to the ends 604. The kingpin 805 extends from the ride plate 804 on the lower surface of the pivot fifth wheel 102. FIG. 8C is a rear end plan view of the pivot fifth wheel 102 of FIG. 8A.

What is claimed is:

1. A trailer comprising:
   a trailer main frame comprising a forward end and a rearward end;
   a neck portion rigidly affixed to the forward end of the main frame;
   a pivot fifth wheel rotatably affixed to the neck portion, the pivot fifth wheel rotatable with respect to the neck portion, the pivot fifth wheel configured to removably attach to a fifth wheel of a towing vehicle;
   an axle frame rotatably affixed to the rearward end of the main frame, the axle frame rotatable with respect to the main frame; and
   frontward hydraulic cylinders extending substantially vertically between the neck portion and the pivot fifth wheel, the frontward hydraulic cylinders configured to push down on the pivot fifth wheel and lift the neck and the main frame upwardly a vertical distance.

2. The trailer of claim 1, further comprising rearward hydraulic cylinders extending between the axle frame and the main frame, the rearward hydraulic cylinders configured to push down on the axle frame and lift the main frame the vertical distance.

3. The trailer of claim 1, wherein the vertical distance is between four (4) inches and eighteen (18) inches.

4. The trailer of claim 1, wherein the neck portion comprises a plurality of openings at a forward end of the neck, the openings configured to receive protrusions extending from the pivot fifth wheel.

5. The trailer of claim 4, each of the protrusions affixed to a lower end of one of the frontward hydraulic cylinders.

6. The trailer of claim 5, an upper end of each of the frontward hydraulic cylinders affixed to an upper cross tube of the neck portion, such that each hydraulic cylinder extends between the upper cross tube of the neck portion and one of the protrusions of the pivot fifth wheel.

7. The trailer of claim 6, where the protrusions of the pivot fifth wheel and the upper cross tube of the neck portion are in a same vertical plane.

8. The trailer of claim 1, a kingpin disposed on a lower side of the pivot fifth wheel for releasable connection to the fifth wheel of the towing vehicle.

9. A trailer comprising:
a trailer main frame comprising a forward end and a rearward end;
the forward end comprising a neck portion;
a pivot fifth wheel rotatably affixed to the neck portion, the pivot fifth wheel rotatable with respect to the neck portion, the pivot fifth wheel configured to removably attach to a fifth wheel of a towing vehicle;
frontward hydraulic cylinders extending substantially vertically between the neck portion and the pivot fifth wheel, the frontward hydraulic cylinders configured to push down on the pivot fifth wheel and lift the neck and the main frame upwardly a vertical distance.

10. The trailer of claim 9, further comprising an axle frame rotatably affixed to the rearward end of the main frame, the axle frame rotatable with respect to the main frame, the axle frame configured to pivot and move the main frame upwardly the vertical distance.

11. The trailer of claim 10, further comprising rearward hydraulic cylinders extending between the axle frame and the main frame, the rearward hydraulic cylinders configured to push down on the axle frame and lift the main frame the vertical distance.

12. The trailer of claim 10, wherein the vertical distance is between four (4) inches and eighteen (18) inches.

13. The trailer of claim 10, wherein the neck portion comprises a plurality of openings at a forward end of the neck, the openings configured to receive protrusions extending from the pivot fifth wheel.

14. The trailer of claim 13, each of the protrusions affixed to a lower end of one of the frontward hydraulic cylinders.

15. The trailer of claim 14, an upper end of each of the frontward hydraulic cylinders affixed to an upper cross tube of the neck portion, such that each hydraulic cylinder extends between the upper cross tube of the neck portion and one of the protrusions of the pivot fifth wheel.

16. The trailer of claim 15, where the protrusions of the pivot fifth wheel and the upper cross tube of the neck portion are in a same vertical plane.

17. The trailer of claim 9, a kingpin disposed on a lower side of the pivot fifth wheel for releasable connection to the fifth wheel of the towing vehicle.

\* \* \* \* \*